United States Patent
Murac, Jr. et al.

(10) Patent No.: US 7,719,434 B2
(45) Date of Patent: May 18, 2010

(54) METHOD FOR IDENTIFYING CRITICAL FEATURES AS A FUNCTION OF PROCESS

(75) Inventors: Robert E. Murac, Jr., Chester, CT (US); Morton K. Pearson, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 432 days.

(21) Appl. No.: 11/731,632

(22) Filed: Mar. 30, 2007

(65) Prior Publication Data
US 2008/0243267 A1 Oct. 2, 2008

(51) Int. Cl.
*G08B 21/00* (2006.01)
(52) U.S. Cl. ...................................... 340/679
(58) Field of Classification Search ............... 340/679, 340/539.16, 691.72, 35, 691.7; 702/1, 35; 701/19, 29, 33
See application file for complete search history.

(56) References Cited

U.S. PATENT DOCUMENTS

| | | | | |
|---|---|---|---|---|
| 5,961,561 A | * | 10/1999 | Wakefield, II | 701/29 |
| 7,054,822 B2 | * | 5/2006 | McCall | 705/1 |
| 7,266,515 B2 | * | 9/2007 | Costello et al. | 705/27 |
| 7,505,914 B2 | * | 3/2009 | McCall | 705/1 |
| 2005/0171661 A1 | * | 8/2005 | Abdel-Malek et al. | 701/33 |

* cited by examiner

*Primary Examiner*—Phung Nguyen
(74) *Attorney, Agent, or Firm*—Kinney & Lange, P.A.

(57) ABSTRACT

The method for identifying critical features as a function of process provides a way to identify critical features associated with a particular part, and to relate the effect of performing repair processes on the identified critical features. The method includes identifying critical features associated with the part, and determining the effect repair processes will have on the identified critical features. This information is included in a an output that is made available to repair centers. Based on the identification of critical features and the associated effect of repair processes on the identified critical features, repair centers are able to focus process and quality control resources on the identified critical features affected by a particular repair process.

18 Claims, 3 Drawing Sheets

MATRIX FOR RELATING THE EFFECT OF REPAIR PROCESSES ON KEY PRODUCT CHARACTERISTIC FEATURES

| PART FAMILY | KEY PRODUCT CHARACTERISTICS | REPAIR PROCESSES | | | | | | | | | |
|---|---|---|---|---|---|---|---|---|---|---|---|
| HPT/LPT BLADES | | GRIND & DEBURR | STRESS RELIEVE | POWER FLUSH | STRIP, NON-DIFFUSED COATINGS | STRIP, DIFFUSED COATINGS | GRIT BLAST | HEAT TINT | GRIND TIP | BLEND COATING | BLEND REJECTS |
| | MINIMUM WALL THICKNESS | 1 | 1 | 1 | 1 | 1 | 1 | 1 | 3 | 1 | 1 |
| | TIP SHROUD TWIST | 1 | 2 | 1 | 1 | 2 | 1 | 2 | 1 | 1 | 1 |
| | ATTACHMENT AXIAL LENGTH | 1 | 1 | 1 | 1 | 1 | 1 | 1 | 1 | 1 | 1 |
| | MIN. DISTANCE FROM LAST CORE TO MACHINED ATTACHMENT | 1 | 1 | 1 | 1 | 1 | 1 | 1 | 1 | 1 | 1 |
| | PLATFORM SIZE & LOCATION | 1 | 1 | 1 | 1 | 1 | 1 | 1 | 1 | 1 | 1 |
| | TE THICKNESS | 1 | 1 | 1 | 2 | 2 | 1 | 1 | 1 | 1 | 2 |
| | TIP WELD JOINT | 1 | 1 | 1 | 1 | 1 | 1 | 1 | 2 | 1 | 1 |
| | AIRFOIL WALL THICKNESS | 1 | 1 | 1 | 3 | 3 | 1 | 1 | 1 | 3 | 4 |
| | ACCEPTABLE INTERVAL PASSAGE | 1 | 1 | 1 | 1 | 1 | 1 | 1 | 1 | 1 | |

MATRIX FOR RELATING THE EFFECT OF REPAIR PROCESSES ON KEY PRODUCT CHARACTERISTIC FEATURES

| PART FAMILY | KEY PRODUCT CHARACTERISTICS | REPAIR PROCESSES ||||||||||
|---|---|---|---|---|---|---|---|---|---|---|---|
| | | GRIND & DEBURR | STRESS RELIEVE | POWER FLUSH | STRIP, NON-DIFFUSED COATINGS | STRIP, DIFFUSED COATINGS | GRIT BLAST | HEAT TINT | GRIND TIP | BLEND COATING | BLEND REJECTS |
| HPT/LPT BLADES | MINIMUM WALL THICKNESS | 1 | 1 | 1 | 1 | 1 | 1 | 1 | 3 | 1 | 1 |
| | TIP SHROUD TWIST | 1 | 2 | 1 | 1 | 2 | 1 | 2 | 1 | 1 | 1 |
| | ATTACHMENT AXIAL LENGTH | 1 | 1 | 1 | 1 | 1 | 1 | 1 | 1 | 1 | 1 |
| | MIN. DISTANCE FROM LAST CORE TO MACHINED ATTACHMENT | 1 | 1 | 1 | 1 | 1 | 1 | 1 | 1 | 1 | 1 |
| | PLATFORM SIZE & LOCATION | 1 | 1 | 1 | 1 | 1 | 1 | 1 | 1 | 1 | 1 |
| | TE THICKNESS | 1 | 1 | 1 | 2 | 2 | 1 | 1 | 1 | 1 | 2 |
| | TIP WELD JOINT | 1 | 1 | 1 | 1 | 1 | 1 | 1 | 2 | 1 | 1 |
| | AIRFOIL WALL THICKNESS | 1 | 1 | 1 | 3 | 3 | 1 | 1 | 1 | 3 | 4 |
| | ACCEPTABLE INTERVAL PASSAGE | 1 | 1 | 1 | 1 | 1 | 1 | 1 | 1 | 1 | 1 |

FIG. 1

METHOD FOR IDENTIFYING CRITICAL FEATURES AS A FUNCTION OF PROCESS

BACKGROUND

The present invention relates to repair processes and specifically to the identification of critical features associated with repaired parts and the effect of repair processes on the identified critical features.

In the turbine engine industry, as in other industries, the proper repair of manufactured parts is critical to the overall performance of a product. Detailed repair procedures generated by an original equipment manufacturer (OEM) or independent third-party are therefore critical to ensuring the repair of a particular part is performed correctly. These repair procedures may provide a great amount of detail regarding how to perform certain repair processes. However, these repair procedures typically lack input regarding specific features of a repaired part that are critical to the performance of a product. Repair centers are often therefore unaware of which features should receive additional attention post-repair to ensure the critical features are maintained with recommended tolerances.

SUMMARY

The method for identifying critical features as a function of process provides a way to identify critical features associated with a particular part, and to relate the effect of performing repair processes on the identified critical features. The method includes identifying critical features associated with a part and determining the effect a particular repair process or processes will have on the identified critical features. The output of this process lists the identified critical features and the determined effect repair processes have on each of the identified critical features. The output is made available or otherwise communicated to repair shops to alert the repair shops to critical features that should be monitored as a result of performing the repair processes.

BRIEF DESCRIPTION OF THE DRAWINGS

FIG. 1 is a matrix illustrating the relationship between identified key product characteristics and associated repair processes for a particular part.

DETAILED DESCRIPTION

Figure 2:
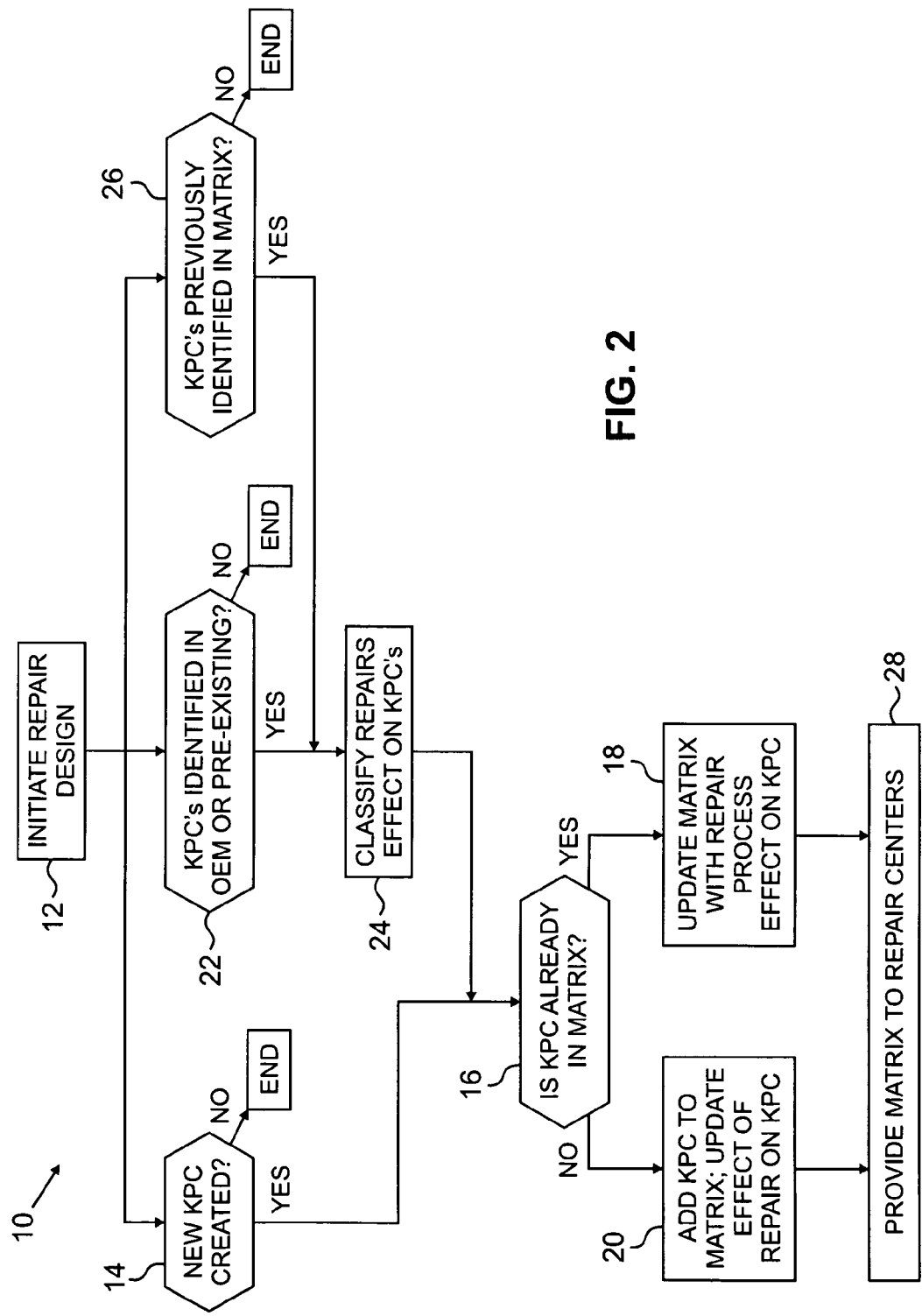
FIG. 2 is a flowchart illustrating the method of identifying key product characteristics and categorizing the effect of repair processes on each key product characteristic.

FIGS. 1 and 2 illustrate a method of identifying critical features, referred to as key product characteristics, and categorizing the effect of repair processes on each identified key product characteristic. This method provides a way to identify and communicate to repair centers those highly critical or important features of a repaired part that should be the focus of process control and/or quality control resources. In this way, the creator of the repair procedure is able to ensure that repairs performed by repair centers and the process control efforts performed by the repair centers are focused on identified features. Thus, the method identifies features critical to operation as well as indicates which repair processes affect the critical features so that following a particular repair process the repair center can focus its limited process control resources on those critical features affected by the repair processes performed.

FIG. 1 illustrates one embodiment of how identified key product characteristics and the effect of repair processes on the key product characteristics can be organized and displayed for communication to a repair center. In other embodiments, the matrix shown in FIG. 1 could be replaced with an equivalent output that can be provided to repair centers to alert them to critical features to be monitored as a result of performing identified repair processes.

As shown in FIG. 1, the matrix is divided into three major columns, labeled 'Part Family', 'Key Product Characteristics', and 'Repair Processes'. The 'Part Family' column lists a particular part or component that is being repaired. In this particular example the part listed in the Part Family column is the 'HPT/LPT—Blades'. The next column, labeled 'Key Product Characteristics', lists all the key product characteristics identified as critical to the part listed in the 'Part Family' column. For example, key product characteristics identified in this example include: minimum wall thickness, tip shroud twist, attachment axial length, minimum (min.) distance from cast core to machined attachment, platform size and location, trailing edge (TE) thickness, tip weld joint, airfoil wall thickness, and acceptable internal passage. The next column, labeled 'Repair Processes', includes a number of individual columns that list all repair processes that may be performed on the part listed in the part family. The enumeration of all repair processes that may be performed on the part listed in the 'Part Family' column does not imply an order in which repair processes are performed, but rather lists each individual repair process that may be performed on the listed part.

In the matrix shown in FIG. 1, each key product characteristic listed in the key product characteristic column intersects with each repair process listed under the column 'Repair Processes'. At the intersection between each key product characteristic and each individual repair process, a number is provided to indicate the effect the repair process has on the key product characteristic. In the example shown in FIG. 1, the numbers 1-4 are used to identify the different effects a repair process can have on a key product characteristic. Categories are defined by the following table.

TABLE 1

| Category | Effect of Repair Process on KPC | Action Required as a Result of the Classification |
|---|---|---|
| 1 | KPC not affected by the repair process | No action required |
| 2 | KPC indirectly affected by the repair process | Add to post repair inspection |
| 3 | KPC directly affected by the repair process | Add to post repair inspection if not already included |
| 4 | KPC created by the repair process | Add to post repair inspection and flag for inspection in future shop visits |

As shown in Table 1, if the intersection of a KPC and repair process is labeled with a '1', then the repair process has no effect on the KPC and as a result does not require any additional action. If the intersection of a KPC and repair process is labeled with a '2', then the repair process has an indirect effect on the KPC and as a result the KPC should be added to the post repair inspection. If the intersection of a KPC and a repair process is labeled with a '3', then the repair process has a direct effect on the KPC and as a result should also be added to the post repair inspection. If the intersection of a KPC and a repair process is labeled with a '4', then the repair process is responsible for creating the KPC. In this case, the KPC should be added to the post-repair inspection and flagged for future inspections. That is, the KPC should be monitored in subsequent visits to a repair center. By identifying repair processes that affect a KPC (as indicated by categories 2, 3 and 4 at the intersection of the KPC and the repair process) a repair center is notified of the importance of devoting process control or other quality control resources to ensuring the identified key product characteristics are maintained with defined tolerances following a specified repair process.

For example, as shown in the matrix in FIG. 1, the repair process labeled 'grind tip' has an indirect effect on the KPC labeled 'tip weld joint', as indicated by the label '2' at the intersection of the repair process and the KPC. This communicates to a repair shop that by performing the repair process 'grind tip' on a HPT/LPT blade, the tip weld joint may be indirectly affected by the repair process and that following the repair process, the tip weld joint should be added to the post-repair inspection. By identifying a KPC that is indirectly affected by a repair process, the repair center is notified of a critical feature that would benefit from additional process control measures. In this way, a repair center is able to focus limited process control resources on critical features, and furthermore on critical features affected by a repair process performed by the repair center.

In addition, as shown in FIG. 1, the repair process labeled 'grind tip' also has an effect on the KPC labeled 'minimum wall thickness'. In this case, the minimum wall thickness is directly affected by the 'grind tip' repair process, as indicated by the label '3' at the intersection of the repair process and the KPC. In many cases, KPC's that are directly affected by a repair process are already measured and verified post repair, since the repair process's effect on the KPC is evident. However, by identifying the minimum wall thickness as a critical feature, repair centers are alerted to the importance of ensuring that the affected KPC is maintained within a proscribed range or tolerance.

As shown in the matrix of FIG. 1, the repair process labeled 'blend rejects' has the effect of creating a KPC labeled 'airfoil wall thickness', as indicated by the label '4' at the intersection of the repair process and the KPC. The HPT/LPT blades have an airfoil wall thickness prior to the blend rejects repair process. In this example, however, the airfoil wall thickness is not initially identified as a key product characteristic because the manufacturer may have built-in margins that ensure the airfoil wall thickness is greater than a minimum value. As a result of the blend rejects repair process, the airfoil wall thickness is reduced. Therefore, even though the HPT/LPT blade had an associated airfoil wall thickness prior to the repair process, the repair process has an effect that results in the airfoil wall thickness becoming a critical feature. In this way, the blend rejects repair process has the effect of creating the critical feature associated with airfoil wall thickness. As a result, the newly created key product characteristic should be monitored and measured post-repair.

FIG. 2 is a flow chart illustrating one embodiment of a method 10 used to identify critical features (i.e., KPCs) and to categorize the effect of repair processes on the identified KPCs. In the embodiment shown in FIG. 2, the method relates identified key product characteristics to repair processes using the matrix described with respect to FIG. 1, although in other embodiments the relationship between key product characteristics and individual repair processes may be organized in another form of output.

Initiating a repair design at step 12 begins the method of identifying key product characteristics and relating them to repair processes. Repair design refers generally to the process of determining the correct process for repairing a particular part. The repair design process therefore includes generating detailed instructions regarding how to perform a particular repair on a part. The method illustrated in FIG. 2 illustrates an additional aspect of this process, in which key product characteristics (i.e., features critical to operation) are identified based on a number of sources and the effect of each individual repair process on the identified key product characteristic is evaluated. After identifying and relating KPC's to repair processes, the information (e.g., the matrix) is communicated to repair shops responsible for implementing the repair processes. In this way, each repair shop is provided with up-to-date information on critical features (i.e., identified key product characteristics) and those repair processes that may effect key product characteristics. Based on this information, repair shops can use well-known process control methods to ensure repair processes that affect key product characteristics are closely monitored and measured.

Upon initiation of a repair design, a repair process design team responsible for generating the repair processes will use several methods to identify critical features (i.e., key product characteristics). In general, the repair process design team will determine whether the repair process generates a new key product characteristic; whether key product characteristics have been previously identified in OEM or pre-existing data; and review key product characteristics previously identified and included in the matrix. Through these processes, the repair process design team is able to identify those key product characteristics associated with a particular part and the effect a particular repair process will have on each identified key product characteristics.

Following the initialization of a repair design for a particular part, at step 14 the repair process design team determines whether particular repair processes create any new key product characteristic. That is, the repair design team determines whether a particular repair process will create a critical feature that previously did not exist. For example, in repairing an engine casing one of the repair processes includes welding a new engine casing to at least a portion of the old engine casing. As a result of this welding repair process, the welded joint becomes a key product characteristic or critical feature that previously did not exist. In this example the repair process creates a key product characteristic.

If the repair process creates a key product characteristic, then at step 16 the repair process design team determines whether the key product characteristic has been previously identified. If the key product characteristic is already identified in the matrix, perhaps as a result of a previous repair design process or a different repair process, then the relationship between the key product characteristic and the particular repair process being analyzed is updated at step 18 to indicate that this particular repair process is also responsible for generating the previously identified key product characteristic.

If the key product characteristic has not been previously identified, then at step 20 the key product characteristic is added to a list of key product characteristics identified for this particular part or part family. For instance, in the embodiment employing the matrix shown in FIG. 1, the previously unidentified key product characteristic would be added to the column identifying all other key product characteristics associated with this particular part family. In addition to adding the key product characteristic to the matrix, the relationship between the repair process and the newly added key product characteristic is updated. For example, in the embodiment employing the matrix as shown in FIG. 1, the number '4' is placed at the intersection of the repair process and the newly identified key product characteristic to indicate that this key product characteristic was generated as a result of the repair process and should be monitored or measured post-repair. In this way, key product characteristics created as a result of a repair process are identified (and related to the repair process that generated the key product characteristic) such that repair shops performing the repair process are aware of the critical features generated as a result of the repair process. As a result, the repair shops can focus process control resources on ensuring that the critical features are controlled within proscribed ranges.

In addition to determining whether a particular repair process results in the creation of a new key product characteristic, at step 22 the repair process design team reviews original equipment manufacturer (OEM) data and other pre-existing data to determine whether any key product characteristics relevant to the part or part family being repaired are disclosed. For instance, in designing a particular part or component, the OEM designer of the original part may indicate a particular feature as critical to the operation of the part and include this criticality in the design specifications. In designing repair process procedures for this part, it is important to determine whether the repair processes will have an effect on any key product characteristics identified in either the OEM data or other pre-existing data.

If key product characteristics are identified in OEM or pre-existing repair data sheets, then at step 24 these key product characteristics are reviewed to determine the effect of a particular repair process on each identified KPC (i.e., the effect of the repair on the KPC is classified). For instance, in the example of the matrix shown in FIG. 1, the effect of the repair process on each key product characteristic is put into a category that indicates the effect of the repair process on the KPC. For instance, as discussed with respect to FIG. 1, category '1' indicates that the repair process has no effect on the key product characteristic; category '2' indicates that the repair process has an indirect effect on the key product characteristic; and category '3' indicates that the repair process has a direct effect on the key product characters. Category '4', which indicates that the repair process creates a key product characteristic, would only arise if the repair design team determined that the repair process creates a new key product characteristic (as discussed above).

Following the classification of the effect the repair process has on each identified key product characteristic at step 24, the repair process design team determines whether the identified KPCs are already in the matrix at step 16. If the identified KPCs already exist in the matrix, then the repair process design team updates the matrix at step 18 to reflect the effect of the repair process on the identified KPCs. For instance, the KPC may already by listed in the matrix, but the effect of a repair process on the KPC may not include the repair process design team's determination of the effect of the repair process on the identified KPC.

If the KPC is not already present in the matrix, then at step 20 the matrix is updated with the KPCs identified at step 22. For instance, in the example of the matrix discussed with respect to FIG. 1, the repair process design team adds any previously unidentified key product characteristics to the matrix under the column heading "Key Product Characteristics". In addition, the matrix is updated with the classified effect of the repair processes on the identified key product characteristic.

Finally, in addition to determining whether the repair process being analyzed creates a key product characteristic and reviewing OEM and other pre-existing data to identify key product characteristics relevant to a particular part, at step 26 the repair process design team reviews the matrix or equivalent documentation to determine if there are any pre-existing key product characteristics that should be analyzed with respect to the repair process. That is, if a matrix exists for a particular part family, the matrix may already identify a number of key product characteristics critical to a particular part. At step 24, these key product characteristics are reviewed to determine whether the current repair process has any effect on the previously identified key product characteristics. This includes categorizing the effect a repair process has on a key product characteristic using the four categories discussed above. Next, the repair design team determines whether the identified KPCs are already in the matrix at step 16. If the identified KPCs already exist in the matrix, then the repair design team updates the matrix at step 18 to reflect the effect of each repair process on the identified KPC. If the identified KPCs are not already presented in the matrix, then at step 20 the matrix is updated with the previously identified KPCs identified at step 32.

Following the identification of key product characteristics relevant to a particular part family and determinations made regarding the effect of a particular repair process on the identified key product characteristics, this information is exported to the repair centers at step 28. In the embodiment shown in FIG. 1, the information is exported as a matrix that illustrates those key product characteristics that are affected by a particular repair process. In this way, the repair centers are provided with information regarding which features are critical to the performance of the part and those repair processes that affect critical features. Based on this information, the repair centers may direct additional process control resources to ensuring that affected key product characteristics are carefully monitored and maintained within specified tolerances following execution of repair processes that affect the identified key product characteristics.

In addition, by exporting the matrix to each repair center (e.g., electronically or in the form of hardcopies), it ensures that each repair center, even those repair centers not affiliated with one another, operate under the same set of guidelines regarding which features are critical to the operation of a particular part and those repair procedures that affect the critical features.

Figure 3:
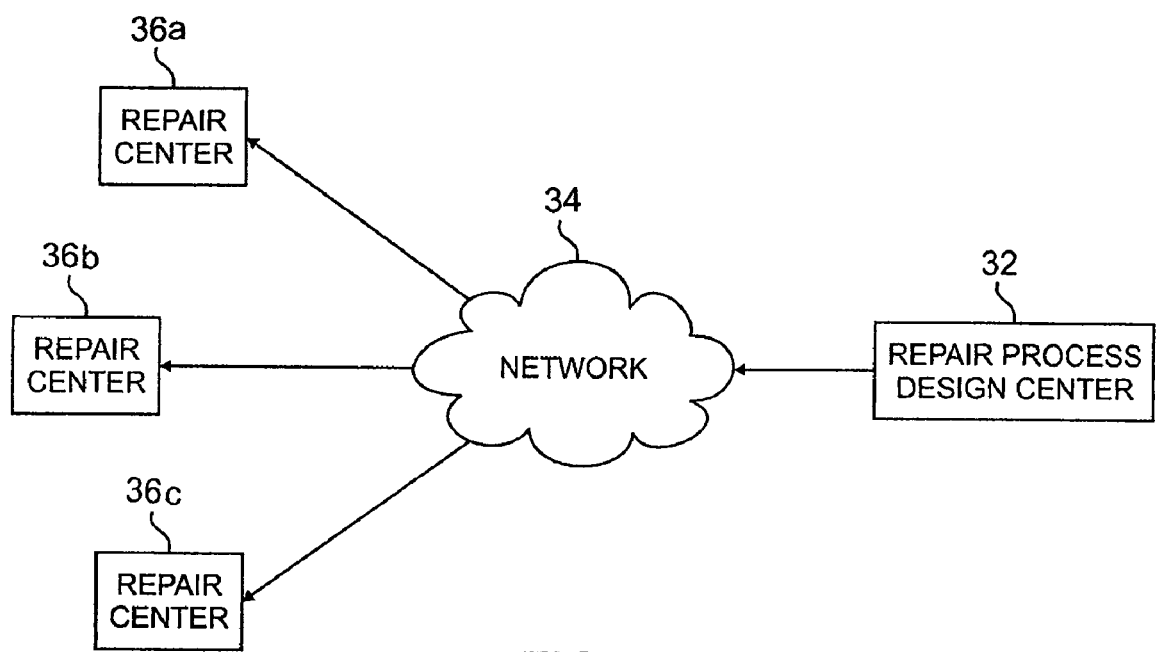
FIG. 3 is a block diagram illustrating a system for providing an output identifying key product characteristics and the effect of repair processes on each key product characteristic to repair centers.

FIG. 3 is a block diagram illustrating the distribution of output identifying key product characteristics and the effect of various repair processes on each identified KPC. The output generated by a repair process design team relating the effect of repair processes on identified KPCs, such as the matrix shown in FIG. 1, is generated and/or stored at repair process design center 32. In one embodiment, repair process design center 32 includes a server and a modem (or equivalent network connection device) that allows repair process design center 32 to access communication network 34. Communication network 34 refers to any number of communication networks, such as telecommunication networks, computer networks, the Internet, or the public switched telephone network. A number of repair centers 36a, 36b, and 36c are connected to network 34. Repair process design center 32 communicates an output such as the matrix to each of the number of repair centers 36a-36c via communications network 34. In this way, despite repair centers 36a-36c operating independently of one another, each is provided with the most recently updated set of data identifying key product characteristics and the effect of repair processes on each identified KPC.

Although the present invention has been described with reference to preferred embodiments, workers skilled in the art will recognize that changes may be made in form and detail without departing from the spirit and scope of the invention.

The invention claimed is:

1. A method of identifying critical features to be monitored as a result of a repair process, the method comprising:
    identifying critical features associated with a part;
    classifying the effect of the repair process on the identified critical feature;
    updating an output relating the effect of the repair process on the identified critical features; and
    providing the output relating the effect of the repair process on the identified critical features to remotely located repair centers.

2. The method of claim 1, wherein identifying critical features associated with a part includes:
    determining whether the repair process results in the generation of a critical feature.

3. The method of claim 1, wherein identifying critical features associated with a particular part includes:
    identifying critical features from pre-existing data.

4. The method of claim 3, wherein the pre-existing data includes original equipment manufacturer (OEM) specifications.

5. The method of claim 1, wherein identifying critical features associated with a part includes:
    reviewing critical features previously identified with respect to the particular part.

6. The method of claim 1, wherein classifying the effect of the repair process on the identified critical features includes:
    classifying the effect of the repair process on the identified critical feature into one of the following categories: (a) the critical feature is not affected by the repair process, (b) the critical feature is indirectly affected by the repair process, (c) the critical feature is directly affected by the repair process, and (d) the critical feature is created by the repair process.

7. The method of claim 6, wherein the output relating the effect of the repair process on the identified critical features includes a matrix that lists identified critical features and the repair processes associated with the part, wherein at the intersection of each of the identified critical features and each of the repair processes a classification label illustrating the effect of the repair process on the critical feature is listed.

8. The method of claim 6, wherein the classification that the critical feature is not affected by the repair process indicates that no action is required with respect to the critical feature as a result of performing the repair process.

9. The method of claim 6, wherein the classification that the critical feature is indirectly affected by the repair process indicates that the critical feature should be added to a post-repair inspection of the part as a result of performing the repair process.

10. The method of claim 6, wherein the classification that the critical feature is directly affected by the repair process indicates that the critical feature should be added to a post-repair inspection of the part as a result of performing the repair process.

11. The method of claim 6, wherein the classification that the critical feature is created as a result of the repair process indicates that the critical feature should be added to a post-repair inspection of the part as a result of performing the repair process.

12. A method of alerting repair centers to critical features affected by a repair process performed by the repair centers, the method comprising:
    initiating a repair process design for a repair process to be performed on a part;
    identifying critical features associated with the part;
    determining the effect of the repair process on the identified critical features;
    generating an output with the identified critical features associated with the part and the determined effect of the repair process on the identified critical features; and
    providing the repair centers with the generated output to alert repair centers to the critical features to be monitored as a result of performing the repair process.

13. The method of claim 12, wherein identifying critical features includes at least one of:
    determining whether the repair process will result in the creation of a critical feature;
    reviewing pre-existing data for critical features associated with the part that have been previously identified; and
    reviewing the database for critical features previously identified with respect to the part.

14. The method of claim 13, wherein reviewing pre-existing data includes reviewing OEM specifications associated with the part.

15. The method of claim 12, wherein determining the effect of the repair process on the identified critical features includes:
    classifying the effect of the repair process on the identified feature into one of the following categories: (a) the critical feature is not affected by the repair process, (b) the critical feature is indirectly affected by the repair process, (c) the critical feature is directly affected by the repair process, and (d) the critical feature is created by the repair process.

16. A system for communicating with repair centers critical features affected by repair processes performed by the repair centers, the system comprising:
    a repair process design center that stores an output that identifies critical features associated with a part and classifies the effect of a repair process on the identified critical feature, wherein the repair process design center is connectable through a network to provide the stored output to each of the repair centers.

17. The system of claim 16, wherein the repair process design center includes:
    a server for storing the output that identifies critical features associated with the part and classifies the effect of the repair process on the identified critical feature.

18. The system of claim 16, wherein the stored output classifies the effect of the repair process on the identified critical features based on a determination of whether (a) the critical feature is not affected by the repair process, (b) the critical feature is indirectly affected by the repair process, (c) the critical feature is directly affected by the repair process, or (d) the critical feature is created by the repair process.

* * * * *